Sept. 4, 1962 W. A. WILLIAMSON 3,052,494
LIFTING DEVICE
Filed Dec. 29, 1959
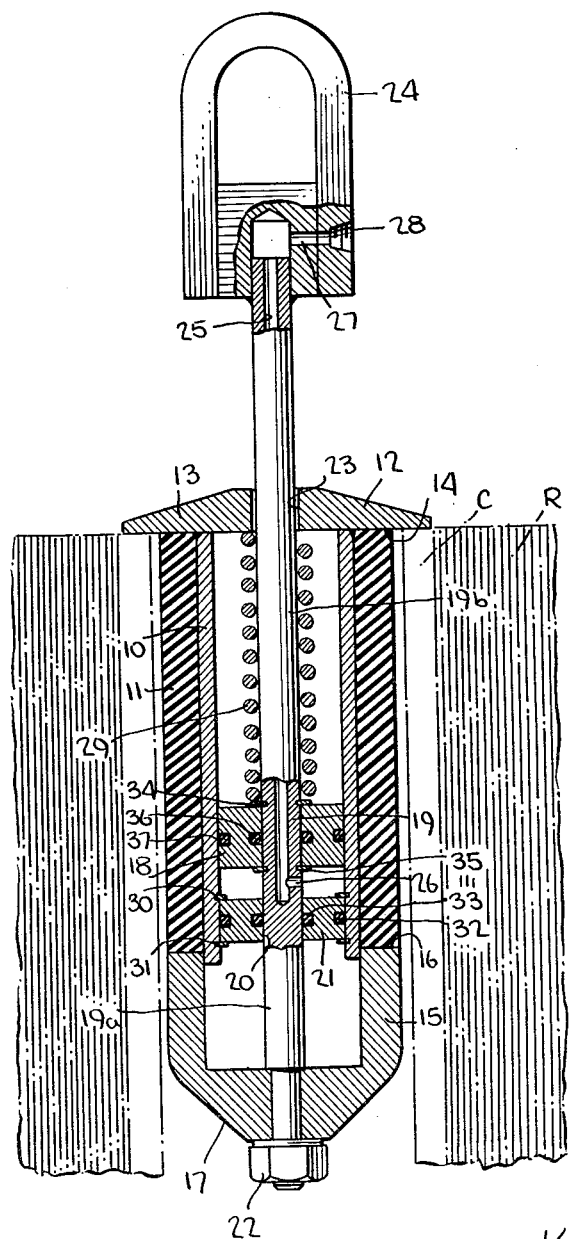
INVENTOR.
W. A. WILLIAMSON
BY
ATTORNEY 3,052,494
Patented Sept. 4, 1962

3,052,494
LIFTING DEVICE
William A. Williamson, Battle Creek, Mich., assignor to
The Yale and Towne Manufacturing Company, Stamford, Conn., a corporation of Connecticut
Filed Dec. 29, 1959, Ser. No. 862,660
6 Claims. (Cl. 294—93)

This invention relates to a roll lifting device of the type having an expandable gripper adapted to be inserted in the hollow core of a heavy roll, such as a roll of paper, and then expanded to grip the hollow core so that the roll may be lifted through the medium of the gripper.

The advantage of a gripper of this type in avoiding damage to the roll, as compared to a gripper which engages the outer surface of the roll, is well known and various constructions for grippers of this type have heretofore been proposed. One construction heretofore proposed utilizes a rubber sleeve or annulus which is expanded radially by introducing fluid under pressure within the sleeve or annulus. While such a gripper has the advantages of being relatively light and inexpensive because it utilizes a simple rubber sleeve as the gripping element, it does have the disadvantage of being solely dependent upon the fluid under pressure for its gripping action. Accordingly, if there is a failure in the fluid system to the gripper, the roll may be dropped.

The present invention provides a gripper which also utilizes a simple rubber sleeve as the gripping element. However, unlike the grippers heretofore proposed, the rubber sleeve is expanded radially to initially grip the core of the roll by compressing the sleeve axially between a pair of opposed surfaces, rather than by inflation. During lifting, the sleeve with the roll gripped thereby is supported by one of the opposed surfaces so that the weight of the roll presses the sleeve against the supporting surface to maintain the sleeve axially compressed and radially expanded into gripping relationship with the core of the roll. Thus, the roll is effectively gripped during lifting even when the mechanism for initially compressing the sleeve fails and the gripper of the present invention is, accordingly, much safer than those heretofore proposed.

In a preferred form of the invention, the rubber sleeve surrounds a cylindrical member and one of the opposed surfaces for compressing the sleeve is provided by a flange on one end of the cylinder. The other opposed surface is provided by a compressing member slidably received on the other end of the cylinder. The compressing member is moved toward the flange to compress the sleeve in an axial direction by a fluid actuated piston which operates in the cylindrical member and is connected to the compressing member by a piston rod. During lifting, the device is supported from an extension of the piston rod extending from the opposite side of the piston from the compressing member, and the weight of the roll therefore serves to press the sleeve against the compressing member to maintain the sleeve compressed, even though fluid under pressure is cut off from the piston.

The invention and its advantages having been broadly described, a more detailed description of one embodiment of the invention is given hereafter by reference to the accompanying drawing which is a sectional elevational view of a lifting device constructed in accordance with the present invention showing the device inserted in a core of a roll of paper preparatory to its being expanded to grip the core.

Referring to the drawing, the device includes a hollow cylindrical member 10 on which is mounted a resilient rubber sleeve 11. A metal disk 12 is welded, or otherwise secured to the upper end of the cylindrical member 10. The disk 12 extends outwardly from the outer surface of the cylindrical member 10 to provide a flange 13. Flange 13 provides a surface 14 against which the sleeve 11 may be axially compressed. Preferably the flange 13 is of substantially greater diameter than the rubber sleeve 11 so that it may engage the end of a core C of a roll R to limit the insertion of the cylindrical member 10 into the core C.

A cup-shaped compressing member 15, providing an annular surface 16 adapted to engage the lower end of the rubber sleeve 11, is slidably received on the lower end of the cylindrical member 10. Movement of the compressing member 15 toward the flange 13 serves to compress the sleeve 11 axially between the opposed surfaces 14 and 16. Axial compression of the sleeve 11 results in radial expansion of the sleeve to tightly grip the inner surface of the core C. The compressing member 15 is preferably tapered as indicated at 17 to facilitate the insertion thereof into core C.

A piston 18 is slidably mounted in the bore of the hollow cylindrical member 10. The piston 18 has a piston rod 19 secured thereto which extends on both sides of the piston. The lower portion 19a of the piston rod 19 extends slidably through an opening 20 in a head member 21. Head member 21 is secured to and closes the lower end of the cylindrical member 10. The end of the lower portion 19a of the piston rod 19 is secured to the compressing member 15 by a nut 22. Introduction of fluid under pressure between the piston 18 and the head member 21 therefore serves to move the piston 18 and the compressing member 15 upwardly relatively to the cylindrical member 10 and disk 12 so that the rubber sleeve 11 is axially compressed between the surface 14 of the flange 13 and the annular surface 16 of the compressing member 15.

The upper portion 19b of the piston rod 19 extends slidably through an opening 23 in the disk 12 and has suitable means, such as an eye member 24, secured to its upper end so that the lifting device and the roll gripped thereby may be lifted and supported. Fluid under pressure is conveniently introduced between the piston and the head member by means of a passageway 25 extending axially through the upper portion 19b of the piston rod 19 and communicating with the space between the piston 18 and the head member 21 by a lateral passageway 26. A lateral passageway 27 connects the upper end of the passageway 25 with a threaded opening 28 formed in the eye member 24 to which a flexible conduit may be connected to admit fluid under pressure from a suitable source (not shown) to the passageway 25.

A compression spring 29 is disposed around the upper portion 19b of the piston rod 19 and bears at its lower end against the piston 18 and bears at its upper end against the disk 12. Spring 29 serves to return the piston 18 to its non-expanding position when fluid under pressure is released from between the piston 18 and the head member 21.

The head member 21 is conveniently secured to the cylindrical member 10 by retaining rings 30 and 31. O-ring type gaskets 32 and 33 prevent leakage of fluid between the head member 21 and the cylindrical member 10 and between head member 21 and the lower portion 19a of the piston rod 19. The piston 18 is conveniently secured to the piston rod 19 by retaining rings 34 and 35. O-ring type gaskets 36 and 37 prevent leakage of fluid between the piston 18 and the cylindrical member 10 and between the piston 18 and the piston rod 19.

In utilizing the device to lift the roll R, the device is inserted into the core C until the flange 13 of the disk 12 engages the upper edge of the core C as shown in the drawing. Fluid under pressure is then introduced between the piston 18 and the head member 21 to move the piston 18 and the compressing member 15 upwardly relatively to the cylindrical member 10 and disk 12. This results in the rubber sleeve 11 being axially compressed between the surface 14 of the flange 13 and the annular surface 16 of the compressing member 15 so that the sleeve 11 expands radially to tightly grip the inner surface of the core C. The gripped roll R may then be lifted by connecting the eye member 24 to a suitable lifting mechanism. Once the roll R is lifted by the eye member 24, the weight of the roll R is transmitted to the rubber sleeve 11 and further compresses the rubber sleeve 11 against the annular surface 16 to maintain the sleeve axially compressed even in the event that the fluid pressure is released between the piston 18 and the head member 21.

To release the device from the roll R, the roll is lowered until its weight is supported on the floor and the pressure then released from between the piston 18 and the head member 21 so that compression spring 29 returns the piston 18 and the compressing member 15 to non-compressing position. This allows the rubber sleeve 11 to expand axially and contract radially so that the sleeve no longer grips the core C and the device may be lifted out of the core.

From the above description, it can be seen that there is provided a very simple and effective roll-lifting device of the expandable type. Because the weight of the lifted roll maintains the sleeve axially compressed and radially expanded, the device is extremely safe as the roll will continue to be gripped even if there is failure in the fluid circuit to the piston 18. The lifting device may be used on various types of lifting apparatus such as cranes, traveling hoists, lift trucks, and the like.

While one embodiment of the invention has been shown and described, it will be appreciated that this is for the purpose of illustration and that changes and modifications may be made therein without departing from the spirit and scope of the invention. The term, "rubber," is used herein in its generic sense to denote natural rubber, synthetic rubber, and plastic materials exhibiting rubber-like properties.

I now claim:

1. A lifting device adapted to be inserted into a cylindrical opening in an article and expanded to grip the article comprising, a hollow cylindrical member having a flange extending outwardly from one end thereof, a resilient rubber sleeve surrounding said hollow cylindrical member with one end of said sleeve engaging said flange, a compressing member slidably received on the other end of said hollow cylindrical member and providing an annular surface engageable with the other end of said sleeve, a head member secured to said hollow cylinder and closing said cylinder adjacent said other end, a piston in said cylindrical member, a piston rod secured to said piston and extending from both sides of said piston, said piston rod on one side of said piston extending slidably through said head member and being secured to said compressing member, the piston rod on the other side of said piston extending outwardly of said one end of said cylindrical member so that the lifting device may be supported for lifting from the outer end thereof, and means for introducing fluid under pressure between said piston and head member to move said compressing member toward said flange of said hollow cylindrical member to axially compress said sleeve between said flange and said annular surface whereby said sleeve is radially expanded to grip the article.

2. A lifting device adapted to be inserted into a cylindrical opening in an article and expanded to grip the article comprising, a hollow cylindrical member having a flange extending outwardly from one end thereof, a resilient rubber sleeve surrounding said hollow cylindrical member with one end of said sleeve engaging said flange, a compressing member slidably received on the other end of said hollow cylindrical member and providing an annular surface engageable with the other end of said sleeve, a head member secured to said hollow cylinder and closing said cylinder adjacent said other end, a piston in said cylindrical member, a piston rod secured to said piston and extending from both sides of said piston, said piston rod on one side of said piston extending slidably through said head member and being secured to said compressing member, said piston rod on the other side of said piston extending outwardly of said one end of said hollow cylindrical member and having a passageway therethrough communicating with said one side of said piston for introducing fluid under pressure between said piston and said head member to move said compressing member toward said flange of said cylindrical member to axially compress said sleeve between said flange and said annular surface whereby said sleeve is radially expanded to grip the article.

3. A lifting device adapted to be inserted into a cylindrical opening in an article and expanded to grip the article comprising, a hollow cylindrical member having a flange extending outwardly from one end thereof, a resilient rubber sleeve surrounding said hollow cylindrical member with one end of said sleeve engaging said flange, a compressing member slidably received on the other end of said hollow cylindrical member and providing an annular surface engageable with the other end of said sleeve, a head member secured to said hollow cylinder and closing said cylinder adjacent said other end, a piston in said cylindrical member, a piston rod secured to said piston and extending from both sides of said piston, said piston rod on one side of said piston extending slidably through said head member and being secured to said compressing member, said piston rod on the other side of said piston extending outwardly of said one end of said hollow cylindrical member and having a passageway therethrough communicating with said one side of said piston for introducing fluid under pressure between said piston and said head member to move said compressing member toward said flange of said cylindrical member to axially compress said sleeve between said flange and said annular surface to radially expand said sleeve to grip the article, and said compressing member being tapered at its outer end to facilitate the insertion of the device in the opening in the article.

4. A lifting device adapted to be inserted into a cylindrical opening in an article and expanded to grip the article comprising, a hollow cylindrical member having a flange extending outwardly from one end thereof, a resilient rubber sleeve surrounding said hollow cylindrical member with one end of said sleeve engaging said flange, a compressing member slidably received on the other end of said hollow cylindrical member and providing an annular surface engageable with the other end of said sleeve, a head member secured to said hollow cylinder and closing said cylinder adjacent said other end, a piston in said cylinder, a piston rod secured to said piston and extending from both sides of said piston, said piston rod on one side of said piston extending slidably through said head member and being secured to said compressing member, said piston rod on the other side of said piston extending outwardly of said one end of said hollow cylindrical member and having a passageway therethrough communicating with said one side of said piston for introducing fluid under pressure between said piston and said head member to move said compressing member toward the flange of said cylindrical member whereby said sleeve is axially compressed between said flange and said annular surface to radially expand said sleeve to grip the article, and said flange having a substantially greater diameter than said sleeve to limit the extent of insertion of the device in the opening in the article.

5. A lifting device adapted to be inserted into a cylindrical opening in an article and expanded to grip the article comprising, a hollow cylindrical member having a flange extending outwardly from one end thereof, a resilient rubber sleeve surrounding said hollow cylindrical member with one end of said sleeve engaging said flange, a compressing member slidably received on the other end of said hollow cylindrical member and providing an annular surface engageable with the other end of said sleeve, a head member secured to said hollow cylinder and closing said cylinder adjacent said other end, a piston in said cylinder, a piston rod secured to said piston and extending from both sides of said piston, said piston rod on one side of said piston extending slidably through said head member and being secured to said compressing member, said piston rod on the other side of said piston extending outwardly of said one end of said hollow cylindrical member and having a passageway therethrough communicating with said one side of said piston for introducing fluid under pressure between said piston and said head member to move said compressing member toward the flange of said cylindrical member whereby said sleeve is axially compressed between said flange and said annular surface to radially expand said sleeve to grip the article, said flange having a substantially greater diameter than said sleeve to limit the extent of insertion of the device in the opening in the article, and said compressing member being tapered at its outer end to facilitate the insertion of the device in the opening in the article.

6. A lifting device adapted to be inserted into a cylindrical opening in an article and expanded to grip the article comprising, a hydraulic ram for insertion bodily into said cylindrical opening, said hydraulic ram including a hollow cylinder closed at its lower end and formed with a flange extending outwardly from the upper end thereof, a resilient rubber sleeve surrounding said hollow cylinder with the upper end of said sleeve engaging said flange, a compressing member slidable on said hollow cylinder and having an annular flange engageable with the lower end of said rubber sleeve, a piston within said hollow cylinder, a piston rod secured to said piston and extending slidably downwardly through an opening in said closed lower end of said hollow cylinder and secured to said compressing member, means secured to said piston and extending upwardly therefrom by which the lifting device may be lifted and supported, and means for introducing fluid under pressure between said piston and said closed lower end of said hollow cylinder to move said compressing member toward said flange of said hollow cylinder to axially compress said rubber sleeve between said flange of said hollow cylinder and said annular flange of said compressing member whereby said rubber sleeve is radially expanded to grip the article.

References Cited in the file of this patent

UNITED STATES PATENTS

| | | |
|---|---|---|
| 922,544 | Turner et al. | May 25, 1909 |
| 1,457,596 | Nutter | June 5, 1923 |
| 1,488,716 | Spitler | Apr. 1, 1924 |
| 1,801,353 | Lane et al. | Apr. 21, 1931 |
| 2,486,489 | McDermott | Nov. 1, 1949 |
| 2,538,693 | Maisch | Jan. 16, 1951 |
| 2,575,937 | Bent | Nov. 20, 1951 |
| 2,738,192 | Wells | Mar. 13, 1956 |
| 2,824,577 | Grunsky | Feb. 25, 1958 |
| 2,826,445 | Tidland | Mar. 11, 1958 |
| 2,988,396 | Davies | June 13, 1961 |

OTHER REFERENCES

Enziger-Union-Werke, German application 1,048,820, printed January 15, 1959, 294—93 (KL 81a 15/01).